US012154773B2

(12) United States Patent
Cooks et al.

(10) Patent No.: US 12,154,773 B2
(45) Date of Patent: *Nov. 26, 2024

(54) SYSTEMS AND METHODS FOR COLLISION INDUCED DISSOCIATION OF IONS IN AN ION TRAP

(71) Applicant: Purdue Research Foundation, West Lafayette, IN (US)

(72) Inventors: Robert Graham Cooks, West Lafayette, IN (US); Dalton Snyder, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 949 days.

This patent is subject to a terminal disclaimer.

(21) Appl. No.: 17/144,394

(22) Filed: Jan. 8, 2021

(65) Prior Publication Data

US 2021/0159062 A1 May 27, 2021

Related U.S. Application Data

(63) Continuation of application No. 16/073,255, filed as application No. PCT/US2017/026269 on Apr. 6, 2017, now Pat. No. 10,923,336.

(Continued)

(51) Int. Cl.
*H01J 49/00* (2006.01)
*H01J 49/42* (2006.01)

(52) U.S. Cl.
CPC ...... *H01J 49/0031* (2013.01); *H01J 49/0027* (2013.01); *H01J 49/0045* (2013.01);

(Continued)

(58) Field of Classification Search
CPC ............... H01J 49/0031; H01J 49/0027; H01J 49/0045; H01J 49/0068; H01J 49/427; H01J 49/4295
See application file for complete search history.

(56) References Cited

U.S. PATENT DOCUMENTS 5,572,025 A * 11/1996 Cotter ................ H01J 49/0009 250/282
7,335,897 B2 2/2008 Takats et al.
(Continued)

FOREIGN PATENT DOCUMENTS

WO 2009/102766 A1 8/2009

OTHER PUBLICATIONS

Carroll, 1975, Atmospheric Pressure Ionization Mass Spectrometry: Corona Discharge Ion Source for Use in Liquid Chromatograph-Mass Spectrometer-Computer Analytical System, Anal. Chem. 47:2369-2373.

(Continued)

*Primary Examiner* — David A Vanore
(74) *Attorney, Agent, or Firm* — Brown Rudnick LLP; Adam M. Schoen

(57) ABSTRACT

The invention generally relates to systems and methods for collision induced dissociation of ions in an ion trap. In certain aspects, the invention provides a system that includes a mass spectrometer having an ion trap, and a central processing unit (CPU). The CPU includes storage coupled to the CPU for storing instructions that when executed by the CPU cause the system to generate one or more signals, and apply the one or more signals to the ion trap in a manner that all ions within the ion trap are fragmented at a same Mathieu q value.

6 Claims, 12 Drawing Sheets

Related U.S. Application Data

(60) Provisional application No. 62/318,904, filed on Apr. 6, 2016.

(52) U.S. Cl.
CPC ........ *H01J 49/0068* (2013.01); *H01J 49/427* (2013.01); *H01J 49/4295* (2013.01)

(56) References Cited

U.S. PATENT DOCUMENTS

| | | | | |
|---|---|---|---|---|
| 8,304,718 | B2 | 11/2012 | Ouyang et al. | |
| 8,859,956 | B2 | 10/2014 | Ouyang et al. | |
| 2010/0282963 | A1 * | 11/2010 | Remes ................ | H01J 49/4225 250/282 |
| 2014/0224981 | A1 | 8/2014 | Owen et al. | |
| 2014/0264004 | A1 | 9/2014 | Cooks et al. | |

OTHER PUBLICATIONS

Cody, 2005, Versatile New Ion Source for the Analysis of Materials in Open Air under Ambient Conditions, Anal. Chem., 77:2297-2302.

Douglas, 2005, Linear ion traps in mass spectrometry, Mass Spectrom. Rev, 24:1-29.

Fenn et al., 1989, Electrospray Ionization for Mass Spectrometry of Large Biomolecules, Science 246:64-71.

Fico, 2007, Miniaturization and Geometry Optimization of a Polymer-Based Rectilinear Ion Trap, Anal. Chem., 79:8076-8082.

Gao, 2006, Handheld Rectilinear Ion Trap Mass Spectrometer, Anal. Chem., 78:5994-6002.

Gao, 2008, Design anc Characterization of a Multisource Hand-Held Tandem Mass Spectrometer, Z. Anal. Chem, 80:7198-7205.

Gao, 2008, Breaking the pumping speed barrier in mass spectrometry: discontinuous atmospheric pressure interface, Anal. Chem, 80:4026-4032.

Hendricks, 2014, Autonomous in-situ analysis and real-time chemical detection using a backpack miniature mass spectrometer: concept, instrumentation development, and performance, Anal. Chem., 86:2900-2908.

Hou, 2011, Sampling Wand for an Ion Trap Mass Spectrometer, Anal. Chem., 83:1857-1861.

Karas, 2000, Nano-electrospray ionization mass spectrometry: addressing analytical problems beyond routine, Fresenius J. Anal. Chem., 366:669-676.

Kogelschatz, 2003, Dielectric-barrier Discharges: Their History, Discharge Physics, and Industrial Applications, Plasma Chem. and Plasma Processing, 23:1-46.

Laiko, 2000, Atmospheric Pressure Matrix-Assisted Laser Desoprtion/Ionization Mass Spectrometry, Analytical Chemistry, 72:652-657.

Li, 2014, Mini 12, Miniature Mass Spectrometer for Clinical and other Applications—Introduction and Characterization, Anal. Chem., 86:2909-2916.

Mar. 1997, An Introduction to Quadrupole Ion Trap Mass Spectrometry, J. Mass Spectrom, 32:351-369.

Mulligan, 2006, Desorption electrospray ionization with a portable mass spectrometer: in situ analysis of ambient surfaces, Chem Comm, et al., Chemical Communications, 1709-1711.

Ouyang, 2004, Rectilinear ion trap: concepts, calculations, and analytical perforomace of a new mass analyers, Analytical Chemistry, 76:4595-4605.

Ouyang, 2009, Handheld Miniature Ion Trap Mass Spectrometers, Anal. Chem., 81(7):2421-2425.

Ouyang, 2009, Miniature Mass Spectrometers, Ann. Rev. Anal. Chem., 2:187-214.

Pan, 2004, Nanoelecyrospray Ionization of Protein Mixtures: Solution pH and Protein pl, Anal. Chem, 76:1165-1174.

Sanders, 2009, Hand-held Mass Spectrometer for Environmentally Relevant Analytes Using a Variety of Sampling and Ionization Methods, Euro. J. Mass Spectrom,16:11-20.

Shiea, 2005, Electrospray-assisted laser desorption/ionization mass spectrometry for direct ambient analysis of solids, J. Rapid Comm in Mass Spectrometry, 19:3701-3704.

Sokol, 2011, Miniature mass spectrometer equipped with electrospray and desorption electrospray inonization for direct analysis of organics from solids and solutions, Int. J. Mass Spectrom., 306:187-195.

Takats, 2004, "Mass spectrometry sampling under ambient conditions with desorption electrospray ionization" Science, vol. 306: pp. 471-473.

Tanaka, 1988, Protein and Polymer Analyses up to m/z 1000000 by Laser Ionization Time-of-flight Mass Spectrometry, Rapid Commun. Mass Spectrom., 2:151-153.

Xu, 2010, Miniartureization of Mass Spectrometry Analysis Systems, JALA, 15(6):433-439.

Yamashita, 1984, Electrospray Ion Source. Another Variation on the Free-Jet Theme, J. Phys. Chem., 88:4451-4459.

* cited by examiner

SYSTEMS AND METHODS FOR COLLISION INDUCED DISSOCIATION OF IONS IN AN ION TRAP

RELATED APPLICATION

The present application is a continuation of U.S. nonprovisional application Ser. No. 16/073,255, filed Jul. 26, 2018, which is a 35 U.S.C. § 371 national phase application of PCT/US17/26269, filed Apr. 6, 2017, which claims the benefit of and priority to U.S. provisional application Ser. No. 62/318,904, filed Apr. 6, 2016, the content of each of which is incorporated by reference herein in its entirety.

GOVERNMENT INTEREST

This invention was made with government support under NNX12AB16B and NNX16AJ25G awarded by the National Aeronautics and Space Administration (NASA). The government has certain rights in the invention.

FIELD OF THE INVENTION

The invention generally relates to systems and methods for collision induced dissociation of ions in an ion trap.

BACKGROUND

Collision-induced dissociation (CID) of ions in quadrupole ion traps lends many benefits to mass spectrometry as a method of complex mixture analysis. Dissociation of ions into their respective fragments gives information about the structure of the precursor ion, allowing the structural elucidation of unknowns. Each stage of CID also can drastically increase signal-to-noise since the inherent chemical noise is filtered out. Analyte selectivity is increased via selected (or multiple) reaction monitoring (SRM/MRM), which is particularly useful for quantitative analysis.

The primary method of CID in ion traps is via resonance excitation, where a small alternating current (AC) signal is applied in a dipolar manner to opposite trap electrodes, thereby generating an additional oscillating field to supplement the quadrupole field provided by the driving radiofrequency (RF) waveform. If the frequency of this signal matches the secular frequency ($\omega_u=\beta_u\Omega/2$, where u is a dimension of the quadrupole field, $\beta$ is the Mathieu parameter, and $\Omega$ is the angular RF frequency) of ions of a given m/z, then those ions will be excited to higher trajectories within the trap, gain kinetic energy from the RF field, collide with intentionally-introduced bath gas molecules, and fragment due to conversion of kinetic energy to internal energy.

There are various ways in which ions of a small range of m/z values may be fragmented. Among them are red-shifted off-resonance large-amplitude excitation, high amplitude short time excitation, dynamic collision-induced dissociation with fundamental and higher-order excitation frequencies, "fast excitation" CID, and off-resonance CID using beat frequencies.

Several methods of broadband excitation also exist. In these methods, ions of multiple m/z values are fragmented either simultaneously, e.g. stored waveform inverse Fourier transform (SWIFT), or during a single scan of a given parameter (e.g. secular frequency scan). A secular frequency scan can be used to fragment ions of different masses as a function of time by sweeping the frequency of the supplementary AC at constant RF amplitude, but the method is somewhat limited by the different q value at which each ion fragments. This results in a limited distribution of product ions and variable product ion mass ranges.

A second method of broadband dissociation is dipolar DC collisional activation, in which DC potentials of opposite polarities are applied to opposite electrodes, thus displacing the ion cloud from the center of the trap. The ions absorb power via slow RF heating and eventually dissociate. This technique is simpler than other methods since only a DC potential is needed and multiple generations of product ions can be observed, but only a few analytes have been studied and there is less m/z selectivity than frequency-based methods.

The gold standard method for simultaneous excitation of multiple ions is SWIFT. The masses of the ions to be fragmented are converted to secular frequencies for incorporation into a complex waveform consisting of sinusoids spaced every ~100-500 Hz with phases distributed according to a quadratic function. This waveform is then applied for a short time in a dipolar manner, resulting in broadband excitation of ions. SWIFT is the most efficient ion dissociation technique because of the broad range of resonance frequencies that are included, but generally it is performed at constant RF potential (and thus constant q for a given m/z), resulting in poor fragmentation or product ion collection, or limited product ion mass range for many precursor ions.

SUMMARY

The invention provides systems and methods of broadband dissociation in which a reverse or forward RF amplitude ramp is combined with a fixed frequency resonance excitation waveform. All ions are fragmented at the same Mathieu q value, which is chosen for optimal mass range and CID efficiency, resulting in a broad distribution of product ions and high product ion intensity.

In certain aspects, the invention provides mass spectrometry systems that include a mass spectrometer having an ion trap, and a central processing unit (CPU). The CPU includes storage coupled to the CPU for storing instructions that when executed by the CPU cause the system to generate one or more signals, and apply the one or more signals to the ion trap in a manner that all ions within the ion trap are fragmented at a same Mathieu q value. Preferably, the Mathieu q value is chosen for optimal mass range and collision induced dissociation efficiency. The mass spectrometer may optionally be a miniature mass spectrometer, such as described for example in Gao et al. (Z. Anal. 15 Chem. 2006, 78, 5994-6002), Gao et al. (Anal. Chem., 80:7198-7205, 2008), Hou et al. (Anal. Chem., 83:1857-1861, 2011), Sokol et al. (Int. J. Mass Spectrom., 2011, 306, 187-195), Xu et al. (JALA, 2010, 15, 433-439); Ouyang et al. (Anal. Chem., 2009, 81, 2421-2425); Ouyang et al. (Ann. Rev. Anal. Chem., 2009, 2, 187-25 214); Sanders et al. (Euro. J. Mass Spectrom., 2009, 16, 11-20); Gao et al. (Anal. Chem., 2006, 78(17), 5994-6002); Mulligan et al. (Chem. Com., 2006, 1709-1711); and Fico et al. (Anal. Chem., 2007, 79, 8076-8082).), the content of each of which is incorporated herein by reference in its entirety. The mass spectrometer, or miniature mass spectrometer may optionally include a discontinuous interface, such as a discontinuous atmospheric pressure interface (U.S. Pat. No. 8,304,718, the content of which is incorporated by reference herein in its entirety).

In certain embodiments, the one or more signals includes a radio frequency (RF) signal in which an amplitude of the RF signal ramps in a reverse direction from high amplitude to low amplitude. The radio frequency (RF) signal may be applied simultaneously with a second signal that is a fixed frequency resonance excitation waveform. An exemplary fixed frequency resonance excitation waveform is a supplementary alternating current (AC) signal. In certain embodiments, an amplitude of the supplementary alternating current (AC) signal is varied as a function of time. For example, the amplitude of the supplementary alternating current (AC) signal may be ramped from a high amplitude to a low amplitude. The CPU may further cause the system to adjust the one or more signals applied to the ion trap to cause the fragments to be ejected from the ion trap.

Other aspects of the invention provide mass spectrometry systems that include a mass spectrometer having an ion trap, and a central processing unit (CPU). The CPU includes storage coupled to the CPU for storing instructions that when executed by the CPU cause the system to generate a radio frequency (RF) signal of variable amplitude, and apply the RF signal to the ion trap in a manner that the RF signal amplitude is ramped is a reverse direction from high amplitude to low amplitude. Other aspects of the invention provide mass spectrometry systems that include a mass spectrometer having an ion trap, and a central processing unit (CPU). The CPU includes storage coupled to the CPU for storing instructions that when executed by the CPU cause the system to generate a radio frequency (RF) signal of variable amplitude, and apply the RF signal to the ion trap in a manner that the RF signal amplitude is ramped is a forward direction from low amplitude to high amplitude. In this embodiment, the RF amplitude is ramped in the forward direction, the excitation frequency stays constant, the excitation amplitude increases with time, and the ejection waveform frequency increases (nonlinearly) with time. In either embodiment, the mass spectrometer may optionally be a miniature mass spectrometer. The mass spectrometer, or miniature mass spectrometer may optionally include a discontinuous interface, such as a discontinuous atmospheric pressure interface (U.S. Pat. No. 8,304,718, the content of which is incorporated by reference herein in its entirety).

In certain embodiments, the CPU may further cause the system to apply a second signal that is a fixed frequency resonance excitation waveform with the RF signal that is applied in the reverse or forward direction. The fixed frequency resonance excitation waveform may be a supplementary alternating current (AC) signal. In certain embodiments, an amplitude of the supplementary alternating current (AC) signal is varied as a function of time. For example, the amplitude of the supplementary alternating current (AC) signal is ramped from a high amplitude to a low amplitude (in the reverse direction), or from a low amplitude to a high amplitude (in the forward direction). In certain embodiments, the CPU may further cause the system to adjust the RF signal and the supplementary AC signal applied to the ion trap in a manner that causes fragmented ions to be ejected from the ion trap. In certain embodiments, all ions within the ion trap are fragmented at a same Mathieu q value. Preferably, the Mathieu q value is chosen for optimal mass range and collision induced dissociation efficiency.

Other aspects of the invention provide methods for fragmenting ions in an ion trap that involve trapping ions within an ion trap of a mass spectrometer, and fragmenting the ions within the ion trap by generating, via a computer operably coupled to the ion trap, one or more signals and applying, via the computer, the one or more signals to the ion trap in a manner that all ions within the ion trap are fragmented at a same Mathieu q value.

Other aspects of the invention provide methods for fragmenting ions in an ion trap that involve trapping ions within an ion trap of a mass spectrometer, and fragmenting the ions within the ion trap by generating, via a computer operably coupled to the ion trap, a radio frequency (RF) signal comprising an amplitude, and applying, via the computer, the RF signal to the ion trap in a manner that the RF signal amplitude is varied is a reverse (e.g., high to low amplitude) or forward (e.g., low to high amplitude) direction, thereby fragmenting the ions within the ion trap.

The methods may additionally involve applying, via the computer, a second signal that is a fixed frequency resonance excitation waveform with the RF signal the amplitude of which is applied in the reverse or forward direction. The fixed frequency resonance excitation waveform may be a supplementary alternating current (AC) signal. In certain embodiments, an amplitude of the supplementary alternating current (AC) signal is varied as a function of time. For example, the amplitude of the supplementary alternating current (AC) signal is ramped from a high amplitude to a low amplitude (in the reverse direction), or from a low amplitude to a high amplitude (in the forward direction). In certain embodiments, the methods additionally involve adjusting the RF signal and the supplementary AC signal applied to the ion trap in a manner that causes fragments to be ejected from the ion trap. In certain embodiments, all ions within the ion trap are fragments at a same Mathieu q value. Preferably, the Mathieu q value is chosen for optimal mass range and collision induced dissociation efficiency.

BRIEF DESCRIPTION OF THE DRAWINGS

(FIG. 2A) "blank" excitation spectrum obtained with the scan function in FIG. 1B with an AC amplitude of 0 Vpp, showing the precursor ions and the low mass cut off (lmco; dotted red line) imposed during the CID step; (FIG. 2B) SWIFT excitation spectrum with CID over 210 ms at the (constant) optimized RF amplitude of 372 $V_{0\text{-}p}$; (FIG. 2C) constant q dissociation spectrum with a constant AC frequency of 80 kHz and ramped amplitude from 2.95 Vpp to 0.93 $V_{pp}$ during a 200 ms RF amplitude ramp from 464 V0-p to 127 V0-p. Each CID step was followed by 270 ms of cooling and a 300 ms resonance ejection scan from 188 $V_{0\text{-}p}$ to 1536 $V_{0\text{-}p}$ at 349 kHz, 6.1 $V_{pp}$. Analytes were six quaternary amines: tetrabutylammonium (m/z 242), hexadecyltrimethylammonium (m/z 284), tetrahexylammonium (m/z 355), tetraoctylammonium (m/z 467), and tetraheptylammonium (m/z 411). See Table 1 for relationship between parent and productions.

(FIG. 3A) "blank" excitation spectrum obtained with the scan function in FIG. 1B with an AC amplitude of 0 $V_{pp}$, showing the precursor ions and the lmco (dotted red line) imposed during the CID step; (FIG. 3B)

SWIFT excitation spectrum with CID over 210 ms at the (constant) optimized RF amplitude of 249 $V_{0-p}$. (FIG. 3C) constant q dissociation spectrum with a constant AC frequency of 100 kHz and ramped amplitude from 2.08 $V_{p-p}$ to 1.07 $V_{p-p}$ during a 200 ms RF amplitude ramp from 525 $V_{0-p}$ to 127 $V_{0-p}$. Each CID step was followed by 270 ms of cooling and a 300 ms resonance ejection scan from 188 $V_{0-p}$ to 1536 V0-p at 349 kHz, 6.1 Vpp. Analytes were 2,4-dichloroaniline, chloroaniline, and p-bromoaniline, along with any impurities, reaction products, and metabolites therein. See Table 2 for precursor ions and their corresponding product ions.

FIG. 4A shows the CID spectrum of reserpine (m/z 610) under constant RF amplitude conditions and excitation for 50 ms at 75 kHz; FIG. 4B shows the reverse RF ramp CID spectrum (FIG. 1B). The ions highlighted in red boxes are product ions of m/z 395 and 446, which indicate that multiple stages of MS/MS have been performed (MS3). For (FIG. 4A), reserpine was excited at 75 kHz, 1.5 $V_{p-p}$, for 50 ms with an RF amplitude of 311 $V_{0-p}$ followed by 300 ms of cooling and a 300 ms resonance ejection scan from an RF amplitude of 188 V0-p to 1536 $V_{0-p}$ at 349 kHz, 6.1 $V_{pp}$. During the 200 ms CID stage in (FIG. 4B) the RF amplitude was ramped from 1076 $V_{0-p}$ to 127 $V_{0-p}$ while the AC signal at 85 kHz was ramped from 3.95 $V_{pp}$ to 1.22 $V_{pp}$. This was followed by a 250 ms cooling period and a 300 ms resonance ejection scan from 188 $V_{0-p}$ to 1536 $V_{0-p}$ at 349 kHz, 6.1 $V_{pp}$.

DETAILED DESCRIPTION

Figure 1A:
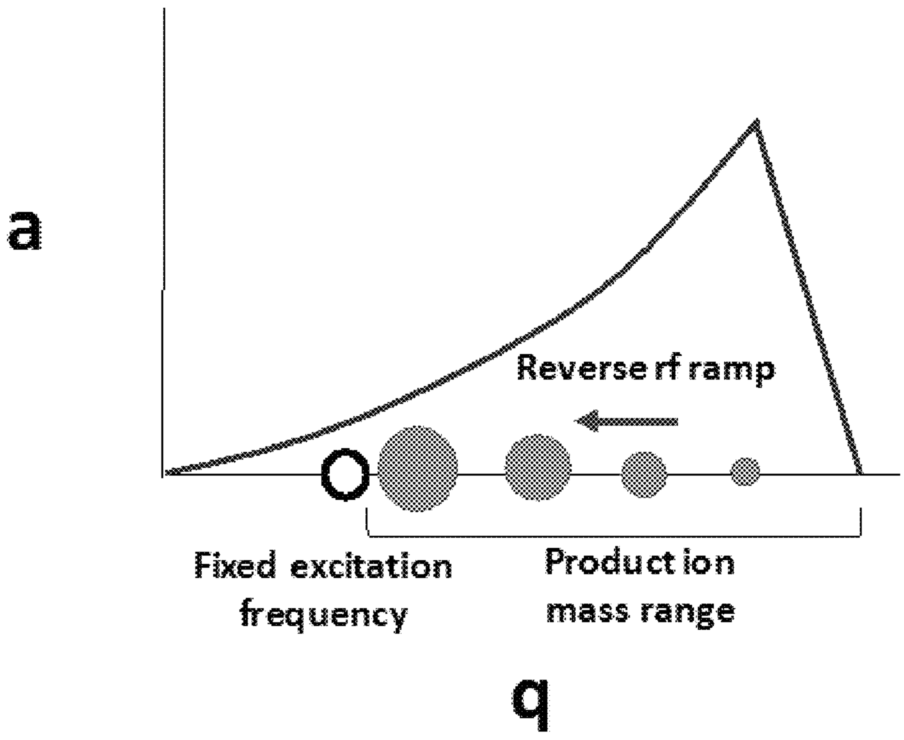
FIGS. 1A-B show broadband collision-induced dissociation at constant q. The method is illustrated (FIG. 1A) on the Mathieu stability diagram, where ions are fragmented in order of decreasing m/z by fixing the frequency of a supplementary excitation signal at an optimal q (generally 0.20-0.35) just below the highest mass of interest and ramping the RF amplitude in the reverse direction. The scan table (FIG. 1B) shows the amplitude of the RF and AC and the frequency of the AC. A similar scan table would apply to the forward RF ramp embodiment. In that embodiment, the RF amplitude would increase and the AC amplitude would increase with time.

The invention generally relates to systems and methods for collision induced dissociation of ions in an ion trap. The systems of the invention implement methods of broadband collision-induced dissociation at a constant Mathieu q value. After injection and cooling, the RF amplitude is increased to bring the lowest m/z of interest to the boundary of the Mathieu stability diagram (q=0.908). A supplementary alternating current (AC) signal at optimal q (0.2-0.35) is then used for ion excitation as the RF amplitude is scanned in the reverse direction, thus fragmenting the ion population from high to low m/z. In other embodiments, the RF amplitude is scanned in the forward direction. The method, implemented on systems of the invention, is shown to be highly efficient, resulting in extensive fragment ion coverage for various ions in complex mixtures. This is the result of exciting each m/z at the same q value, thus giving rise to efficient precursor ion fragmentation, effective product ion collection, and optimal product m/z range.

Methods of broadband ion excitation generally suffer from one of several problems: i) excitation of ions is performed at different q values, leading to varying degrees of fragment ion production and collection as well as varying product ion mass ranges (as in the case of secular frequency scans and SWIFT); ii) ions are not given enough time at resonance (e.g. in secular frequency scans), iii) the amount of internal energy deposition is limited (as in dipolar DC), or iv) mass selectivity is poor (common in dipolar DC).

The key to any CID experiment is to place the ion to be fragmented at an appropriate q value. While there are other considerations that should also be taken into account—for example, excitation amplitude and excitation time—the choice of Mathieu q parameter is highly important. That is because the q parameter determines the ion's pseudo-potential well depth ($D_{x,y}$=$qV_{rf}/4$, where $V_{rf}$ is the 0-peak RF amplitude) which controls how well product ions are collected. At low q, product ions, which are carried far from the center of the trap and thus have high kinetic energies, can be ejected immediately upon formation. They are therefore not detected during the mass scan. The Mathieu q value also limits how much kinetic energy the ion can gain and thus how much can be converted to internal energy, which determines the distribution of product ions. Lastly, in ion traps, the product ion mass range is limited by the q value at which the precursor is excited ($m/z_{product}$<$m/z_{precursor}$*$q_{precursor}$/0.908, where 0.908 corresponds to the q value of the right-hand side boundary of the Mathieu stability diagram). Fragmentation at low q extends mass range compared to high q excitation. Thus, the drive to fragment ions at high pseudo-potential well depth (high q) for optimum fragmentation and product ion collection is offset by the need to retain the product ions in the trap.

Given that q is a very important parameter in CID experiments, a successful broadband CID experiment should hold q constant at an optimal value. This is accomplished by setting the excitation waveform at a constant frequency (see AC frequency, FIG. 1B). On the Mathieu stability diagram (FIG. 1A), this is illustrated by a stationary "hole" on the q axis. In order to fragment a broad range of ions, the RF amplitude should then be scanned. While there are many benefits to scanning the RF in the forward direction, including higher sensitivity and resolution, these are limited to the single stage mass scan. For the purpose of broadband CID, it is more beneficial to sweep the RF amplitude in the reverse direction, although it is also possible to sweep the RF amplitude in the forward direction. First, all precursor ions have the same product ion mass ranges in q space, and the fragment ions are preserved since their q values decrease during the fragmentation step. A second reason for scanning the RF amplitude in the reverse direction is that ion secular frequencies will shift away from the working point, (assuming a positive octopole contribution) as the RF is being scanned, thereby giving each ion longer to be at resonance. This is particularly important during a scan over a broad range of amplitudes in which each ion is only excited for a short period of time.

A second important parameter during the CID scan is the AC amplitude, which should be ramped from high to low to accommodate the fact that ions are excited from high mass to low mass. This accomplishes two things: i) it scales the excitation to the mass of each ion so that ions of each mass are given an appropriate amount of energy (not too much, not too little), and ii) it prevents product ions from being ejected from the trap after they are produced. As shown herein, due to the choice of scan direction, multiple stages of MS/MS can be performed in a single scan, giving rise to product ion distributions unlike that of single stage MS/MS. Other aspects of the invention are discussed below and in the Examples that follow.

Ion Generation

Any approach for generating ions known in the art may be employed. Exemplary mass spectrometry techniques that utilize ionization sources at atmospheric pressure for mass spectrometry include electrospray ionization (ESI; Fenn et al., Science, 246:64-71, 1989; and Yamashita et al., J. Phys. Chem., 88:4451-4459, 1984); atmospheric pressure ionization (APCI; Carroll et al., Anal. Chem. 47:2369-2373, 1975); and atmospheric pressure matrix assisted laser desorption ionization (AP-MALDI; Laiko et al. Anal. Chem., 72:652-657, 2000; and Tanaka et al. Rapid Commun. Mass Spectrom., 2:151-153, 1988). The content of each of these references in incorporated by reference herein its entirety.

Exemplary mass spectrometry techniques that utilize direct ambient ionization/sampling methods including desorption electrospray ionization (DESI; Takats et al., Science, 306:471-473, 2004 and U.S. patent number 7,335,897); direct analysis in real time (DART; Cody et al., Anal. Chem., 77:2297-2302, 2005); Atmospheric Pressure Dielectric Barrier Discharge Ionization (DBDI; Kogelschatz, Plasma Chemistry and Plasma Processing, 23:1-46, 2003, and PCT international publication number WO 2009/102766), ion generation using a wetted porous material (Paper Spray, U.S. Pat. No. 8,859,956), and electrospray-assisted laser desorption/ionization (ELDI; Shiea et al., J. Rapid Communications in Mass Spectrometry, 19:3701-3704, 2005). The content of each of these references in incorporated by reference herein its entirety.

Ion generation can be accomplished by placing the sample on a porous material and generating ions of the sample from the porous material or other type of surface, such as shown in Ouyang et al., U.S. Pat. No. 8,859,956, the content of which is incorporated by reference herein in its entirety. Alternatively, the assay can be conducted and ions generated from a non-porous material, see for example, Cooks et al., U.S. patent application Ser. No. 14/209,304, the content of which is incorporated by reference herein in its entirety). In certain embodiments, a solid needle probe or surface to which a high voltage may be applied is used for generating ions of the sample (see for example, Cooks et al., U.S. patent application publication number 20140264004, the content of which is incorporated by reference herein in its entirety).

In certain embodiments, ions of a sample are generated using nanospray ESI. Exemplary nano spray tips and methods of preparing such tips are described for example in Wilm et al. (Anal. Chem. 2004, 76, 1165-1174), the content of which is incorporated by reference herein in its entirety. NanoESI is described for example in Karas et al. (Fresenius J Anal Chem. 2000 Mar.-Apr.; 366(6-7):669-76), the content of which is incorporated by reference herein in its entirety.

Ion Analysis

Figure 5:
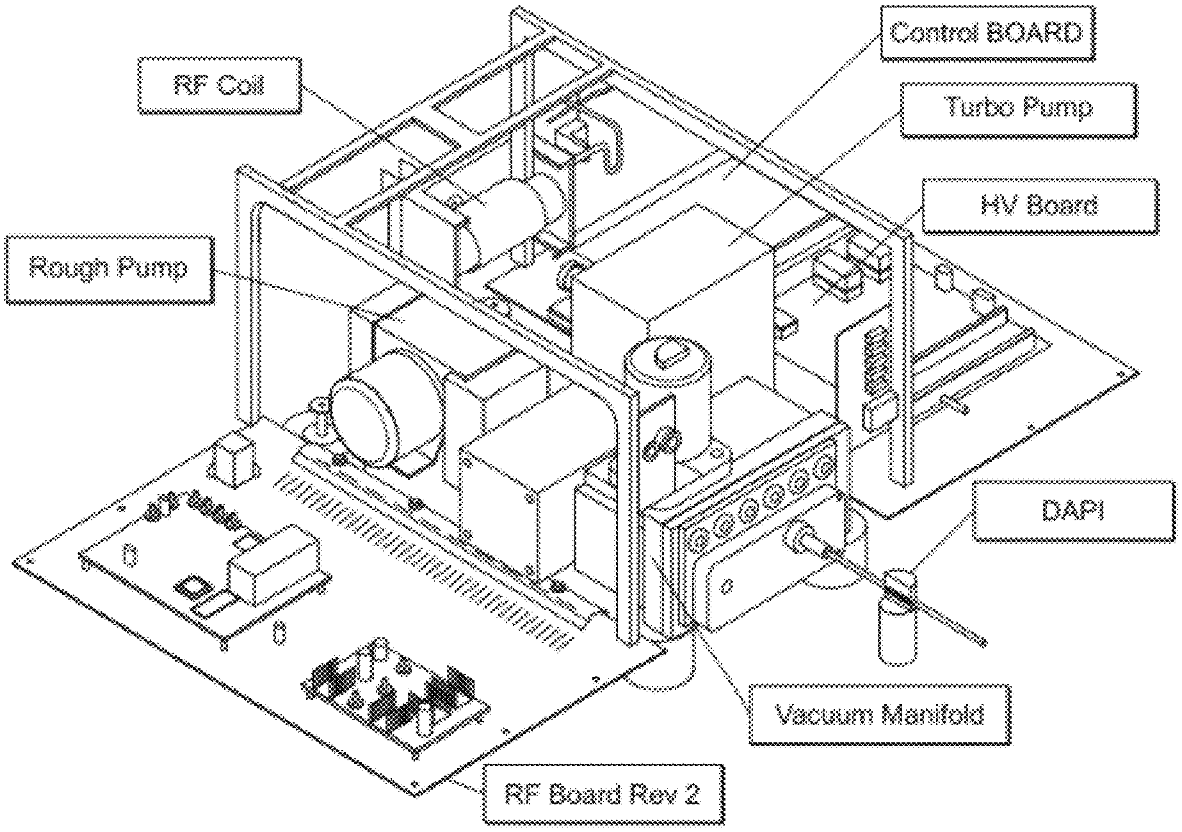
FIG. 5 is a picture illustrating various components and their arrangement in a miniature mass spectrometer.

In certain embodiments, the ions are analyzed by directing them into a mass spectrometer (bench-top or miniature mass spectrometer). FIG. 5 is a picture illustrating various components and their arrangement in a miniature mass spectrometer. The control system of the Mini 12 (Linfan Li, Tsung-Chi Chen, Yue Ren, Paul I. Hendricks, R. Graham Cooks and Zheng Ouyang "Miniature Ambient Mass Analysis System" Anal. Chem. 2014, 86 2909-2916, DOI: 10.1021/ac403766c; and 860. Paul I. Hendricks, Jon K. Dalgleish, Jacob T. Shelley, Matthew A. Kirleis, Matthew T. McNicholas, Linfan Li, Tsung-Chi Chen, Chien-Hsun Chen, Jason S. Duncan, Frank Boudreau, Robert J. Noll, John P. Denton, Timothy A. Roach, Zheng Ouyang, and R. Graham Cooks "Autonomous in-situ analysis and real-time chemical detection using a backpack miniature mass spectrometer: concept, instrumentation development, and performance" Anal. Chem., 2014, 86 2900-2908 DOI: 10.1021/ac403765x, the content of each of which is incorporated by reference herein in its entirety), and the vacuum system of the Mini 10 (Liang Gao, Qingyu Song, Garth E. Patterson, R. Graham Cooks and Zheng Ouyang, "Handheld Rectilinear Ion Trap Mass Spectrometer", Anal. Chem., 78 (2006) 5994-6002 DOI: 10.1021/ac061144k, the content of which is incorporated by reference herein in its entirety) may be combined to produce the miniature mass spectrometer shown in FIG. 5. It may have a size similar to that of a shoebox (H20×W25 cm×D35 cm). In certain embodiments, the miniature mass spectrometer uses a dual LIT configuration, which is described for example in Owen et al. (U.S. patent application Ser. No. 14/345,672), and Ouyang et al. (U.S. patent application Ser. No. 61/865,377), the content of each of which is incorporated by reference herein in its entirety.

The mass spectrometer (miniature or benchtop), may be equipped with a discontinuous interface. A discontinuous interface is described for example in Ouyang et al. (U.S. Pat. No. 8,304,718) and Cooks et al. (U.S. patent application publication number 2013/0280819), the content of each of which is incorporated by reference herein in its entirety.

System Architecture

Figure 6:
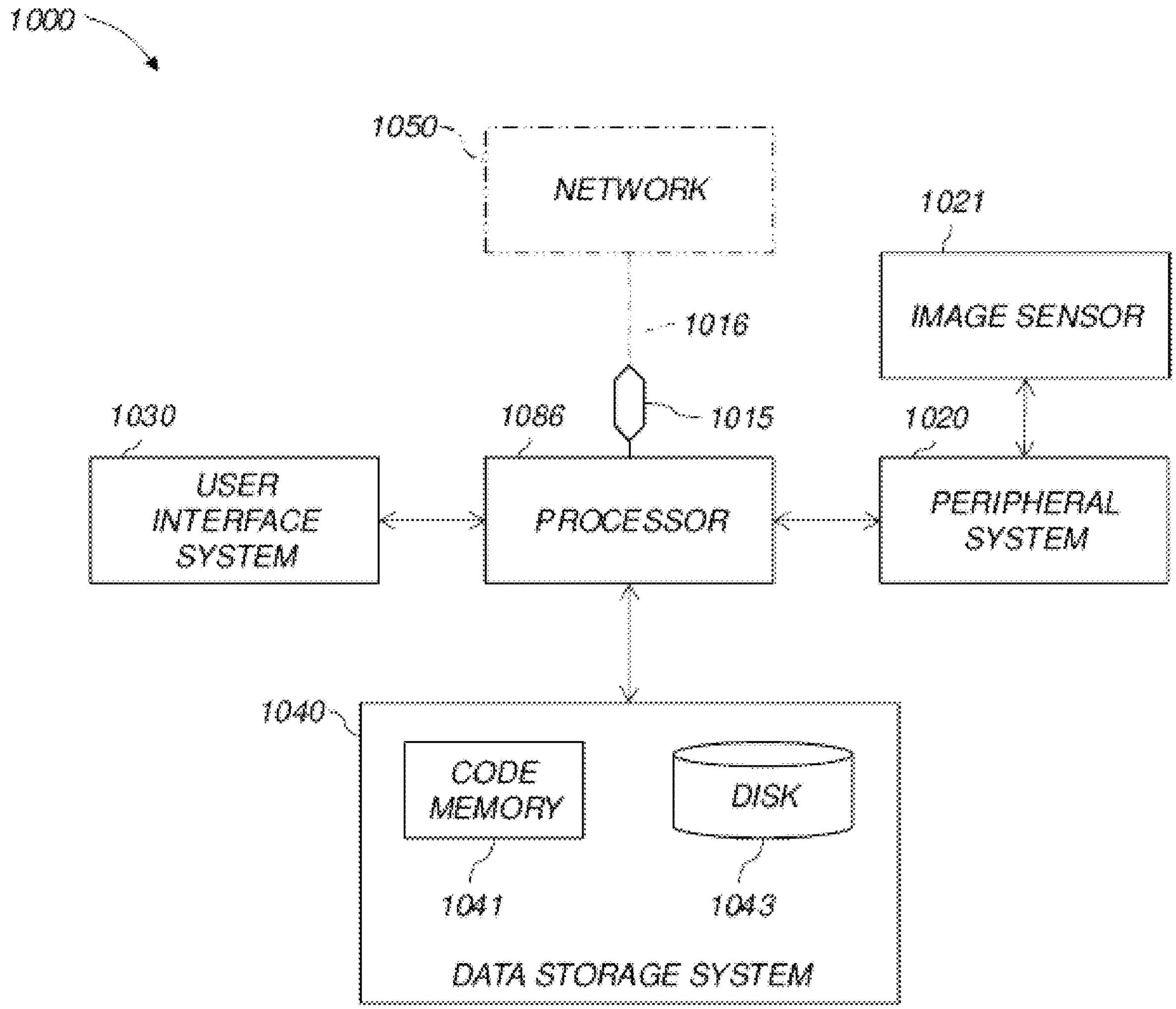
FIG. 6 shows a high-level diagram of the components of an exemplary data-processing system for analyzing data and performing other analyses described herein, and related components.

FIG. 6 is a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The data described above may be obtained using detector 1021 and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 1086 which in one embodiment may be capable of real-time calculations (and in an alternative embodiment configured to perform calculations on a non-real-time basis and store the results of calculations for use later) can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include digital still cameras, digital video cameras, cellular phones, or other data processors. The processor 1086, upon receipt of digital content records from a device in the peripheral system 1020, can store such digital content records in the data storage system 1040.

The user interface system 1030 can include a mouse, a keyboard, another computer (e.g., a tablet) connected, e.g., via a network or a null-modem cable, or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), Universal Serial Bus (USB) interface memory device, erasable programmable read-only memories (EPROM, EEPROM, or Flash), remotely accessible hard drives, and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors) to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Sample

The systems and methods of the invention can be used to analyze many different types of samples. A wide range of heterogeneous samples can be analyzed, such as biological samples, environmental samples (including, e.g., industrial samples and agricultural samples), and food/beverage product samples, etc.).

Exemplary environmental samples include, but are not limited to, groundwater, surface water, saturated soil water, unsaturated soil water; industrialized processes such as waste water, cooling water; chemicals used in a process, chemical reactions in an industrial processes, and other systems that would involve leachate from waste sites; waste and water injection processes; liquids in or leak detection around storage tanks; discharge water from industrial facilities, water treatment plants or facilities; drainage and leachates from agricultural lands, drainage from urban land uses such as surface, subsurface, and sewer systems; waters from waste treatment technologies; and drainage from mineral extraction or other processes that extract natural resources such as oil production and in situ energy production.

Additionally exemplary environmental samples include, but certainly are not limited to, agricultural samples such as crop samples, such as grain and forage products, such as soybeans, wheat, and corn. Often, data on the constituents of the products, such as moisture, protein, oil, starch, amino acids, extractable starch, density, test weight, digestibility, cell wall content, and any other constituents or properties that are of commercial value is desired.

Exemplary biological samples include a human tissue or bodily fluid and may be collected in any clinically acceptable manner. A tissue is a mass of connected cells and/or extracellular matrix material, e.g. skin tissue, hair, nails, nasal passage tissue, CNS tissue, neural tissue, eye tissue, liver tissue, kidney tissue, placental tissue, mammary gland tissue, placental tissue, mammary gland tissue, gastrointestinal tissue, musculoskeletal tissue, genitourinary tissue, bone marrow, and the like, derived from, for example, a human or other mammal and includes the connecting material and the liquid material in association with the cells and/or tissues. A body fluid is a liquid material derived from, for example, a human or other mammal. Such body fluids include, but are not limited to, mucous, blood, plasma, serum, serum derivatives, bile, blood, maternal blood, phlegm, saliva, sputum, sweat, amniotic fluid, menstrual fluid, mammary fluid, peritoneal fluid, urine, semen, and cerebrospinal fluid (CSF), such as lumbar or ventricular CSF. A sample may also be a fine needle aspirate or biopsied tissue. A sample also may be media containing cells or biological material. A sample may also be a blood clot, for example, a blood clot that has been obtained from whole blood after the serum has been removed.

In one embodiment, the biological sample can be a blood sample, from which plasma or serum can be extracted. The blood can be obtained by standard phlebotomy procedures and then separated. Typical separation methods for preparing a plasma sample include centrifugation of the blood sample. For example, immediately following blood draw, protease inhibitors and/or anticoagulants can be added to the blood sample. The tube is then cooled and centrifuged, and can subsequently be placed on ice. The resultant sample is separated into the following components: a clear solution of blood plasma in the upper phase; the buffy coat, which is a thin layer of leukocytes mixed with platelets; and erythrocytes (red blood cells). Typically, 8.5 mL of whole blood will yield about 2.5-3.0 mL of plasma.

Blood serum is prepared in a very similar fashion. Venous blood is collected, followed by mixing of protease inhibitors and coagulant with the blood by inversion. The blood is allowed to clot by standing tubes vertically at room temperature. The blood is then centrifuged, wherein the resultant supernatant is the designated serum. The serum sample should subsequently be placed on ice.

Prior to analyzing a sample, the sample may be purified, for example, using filtration or centrifugation. These techniques can be used, for example, to remove particulates and chemical interference. Various filtration media for removal of particles includes filer paper, such as cellulose and membrane filters, such as regenerated cellulose, cellulose acetate, nylon, PTFE, polypropylene, polyester, polyethersulfone, polycarbonate, and polyvinylpyrolidone. Various filtration media for removal of particulates and matrix interferences includes functionalized membranes, such as ion exchange membranes and affinity membranes; SPE cartridges such as silica- and polymer-based cartridges; and SPE (solid phase extraction) disks, such as PTFE- and fiberglass-based. Some of these filters can be provided in a disk format for loosely placing in filter holdings/housings, others are provided within a disposable tip that can be placed on, for example, standard blood collection tubes, and still others are provided in the form of an array with wells for receiving pipetted samples. Another type of filter includes spin filters. Spin filters consist of polypropylene centrifuge tubes with cellulose acetate filter membranes and are used in conjunction with centrifugation to remove particulates from samples, such as serum and plasma samples, typically diluted in aqueous buffers.

Filtration is affected in part, by porosity values, such that larger porosities filter out only the larger particulates and smaller porosities filtering out both smaller and larger porosities. Typical porosity values for sample filtration are the 0.20 and 0.45 μm porosities. Samples containing colloidal material or a large amount of fine particulates, considerable pressure may be required to force the liquid sample through the filter. Accordingly, for samples such as soil extracts or wastewater, a prefilter or depth filter bed (e.g. "2-in-1" filter) can be used and which is placed on top of the membrane to prevent plugging with samples containing these types of particulates.

In some cases, centrifugation without filters can be used to remove particulates, as is often done with urine samples. For example, the samples are centrifuged. The resultant supernatant is then removed and frozen.

After a sample has been obtained and purified, the sample can be analyzed. With respect to the analysis of a blood plasma sample, there are many elements present in the plasma, such as proteins (e.g., Albumin), ions and metals (e.g., iron), vitamins, hormones, and other elements (e.g., bilirubin and uric acid). Any of these elements may be detected. More particularly, systems of the invention can be used to detect molecules in a biological sample that are indicative of a disease state. Specific examples are provided below.

Where one or more of the target molecules in a sample are part of a cell, the aqueous medium may also comprise a lysing agent for lysing of cells. A lysing agent is a compound or mixture of compounds that disrupt the integrity of the membranes of cells thereby releasing intracellular contents of the cells. Examples of lysing agents include, but are not limited to, non-ionic detergents, anionic detergents, amphoteric detergents, low ionic strength aqueous solutions (hypotonic solutions), bacterial agents, aliphatic aldehydes, and antibodies that cause complement dependent lysis, for example. Various ancillary materials may be present in the dilution medium. All of the materials in the aqueous medium are present in a concentration or amount sufficient to achieve the desired effect or function.

In some examples, where one or more of the target molecules are part of a cell, it may be desirable to fix the cells of the sample. Fixation of the cells immobilizes the cells and preserves cell structure and maintains the cells in a condition that closely resembles the cells in an in vivo-like condition and one in which the antigens of interest are able to be recognized by a specific affinity agent. The amount of fixative employed is that which preserves the cells but does not lead to erroneous results in a subsequent assay. The amount of fixative may depend for example on one or more of the nature of the fixative and the nature of the cells. In some examples, the amount of fixative is about 0.05% to about 0.15% or about 0.05% to about 0.10%, or about 0.10% to about 0.15% by weight. Agents for carrying out fixation of the cells include, but are not limited to, cross-linking agents such as, for example, an aldehyde reagent (such as, e.g., formaldehyde, glutaraldehyde, and paraformaldehyde); an alcohol (such as, e.g., $C_1$-$C_5$ alcohols such as methanol, ethanol and isopropanol); a ketone (such as a $C_3$-$C_5$ ketone such as acetone); for example. The designations $C_1$-$C_5$ or $C_3$-$C_5$ refer to the number of carbon atoms in the alcohol or ketone. One or more washing steps may be carried out on the fixed cells using a buffered aqueous medium.

If necessary after fixation, the cell preparation may also be subjected to permeabilization. In some instances, a fixation agent such as, an alcohol (e.g., methanol or ethanol) or a ketone (e.g., acetone), also results in permeabilization and no additional permeabilization step is necessary. Permeabilization provides access through the cell membrane to target molecules of interest. The amount of permeabilization agent employed is that which disrupts the cell membrane and permits access to the target molecules. The amount of permeabilization agent depends on one or more of the nature of the permeabilization agent and the nature and amount of the cells. In some examples, the amount of permeabilization agent is about 0.01% to about 10%, or about 0.1% to about 10%. Agents for carrying out permeabilization of the cells include, but are not limited to, an alcohol (such as, e.g., $C_1$-$C_5$ alcohols such as methanol and ethanol); a ketone (such as a $C_3$-$C_5$ ketone such as acetone); a detergent (such as, e.g., saponin, TRITON X-100 (4-(1,1,3,3-Tetramethylbutyl)phenyl-polyethylene glycol, t-Octylphenoxypolyethoxyethanol, Polyethylene glycol tert-octylphenyl ether buffer, commercially available from Sigma Aldrich), and TWEEN-20 (Polysorbate 20, commercially available from Sigma Aldrich)). One or more washing steps may be carried out on the permeabilized cells using a buffered aqueous medium.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

Equivalents

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

EXAMPLES

The data herein show mass spectrometry systems that implement methods of broadband ion activation in quadrupole ion traps in which the RF amplitude is ramped in the reverse direction while a constant frequency but decreasing amplitude AC signal is used for mass selective ion excitation. The results here demonstrate remarkable fragmentation efficiency, product ion collection, and product ion mass range, despite limited resonance time. Multiple stages of dissociation can be observed with this technique because of the nontraditional scan direction. Methods of isolation of ions of a particular m/z prior to activation can also include AC frequency scans.

Example 1

Materials and Methods

Nanoelectrospray ionization at ~2-3 kV was used for ion production. Borosilicate glass capillaries (1.5 mm O.D., 0.86 mm I.D., Sutter Instrument Co.) were pulled to an approximate outer diameter of 5 μm using a Flaming/Brown micropipette puller, also from Sutter Instrument Co. (model P-97, Novato, CA USA).

p-Bromoaniline was purchased from Eastman Kodak Co. (Rochester, NY, USA). 2,4-Dichloroaniline and 4-chloroaniline were purchased from Aldrich Chemical Company, Inc. (Milwaukee, WI, USA). Tetraheptylammonium chloride was purchased from Fluka (Switzerland), tetrabutylammonium iodide was obtained from Fluka, hexadecyltrimethylammonium bromide was obtained from Sigma (St. Louis, MO, USA), tetrahexylammonium bromide was obtained from Fluka, and tetraoctylammonium bromide was purchased from Aldrich. Reserpine was obtained from Sigma. Reagents were dissolved in 50:50 MeOH:$H_2O$ with 0.1% formic acid to obtain final concentrations of ~5-100 ppm.

All experiments were performed in the positive ion mode on the Mini 12 miniature mass spectrometer as described for example in Ouyang et al. (Anal Chem 2004, 76, 4595) and Gao et al. (Anal. Chem. 2008, 80, 4026), unless otherwise indicated. The general scan function as well as its illustration on the well-known Mathieu stability diagram are shown in FIG. 1A. Ions were injected into the rectilinear ion trap (March et al., J. Mass Spectrom. 1997, 32, 351) through a discontinuous atmospheric pressure interface (Douglas et al., Mass Spectrom. Rev. 2005, 24, 1.) that was open for ~13 ms. The ion population was then allowed to collisionally cool to the center of the trap for ~600 ms, during which time the pressure inside the vacuum chamber dropped to <1 mTorr. This was followed by a 200 ms CID stage in which either i) a single AC frequency of decreasing amplitude was applied in a dipolar manner to the trap during a reverse RF amplitude ramp, or ii) a SWIFT waveform consisting of all frequencies from 10-500 kHz was applied to effect broadband dissociation while the RF amplitude was kept constant. The CID stage was then followed by a ~270 ms cooling period to allow the resulting product ions to decrease their amplitudes and a 300 ms resonance ejection mass scan at 349 kHz in order to obtain a mass spectrum from m/z 100 to m/z 800. All scans shown are the average of 3 single scans.

Example 2

Fragmented Ions at a Same Mathieu q Value

Figure 1B:
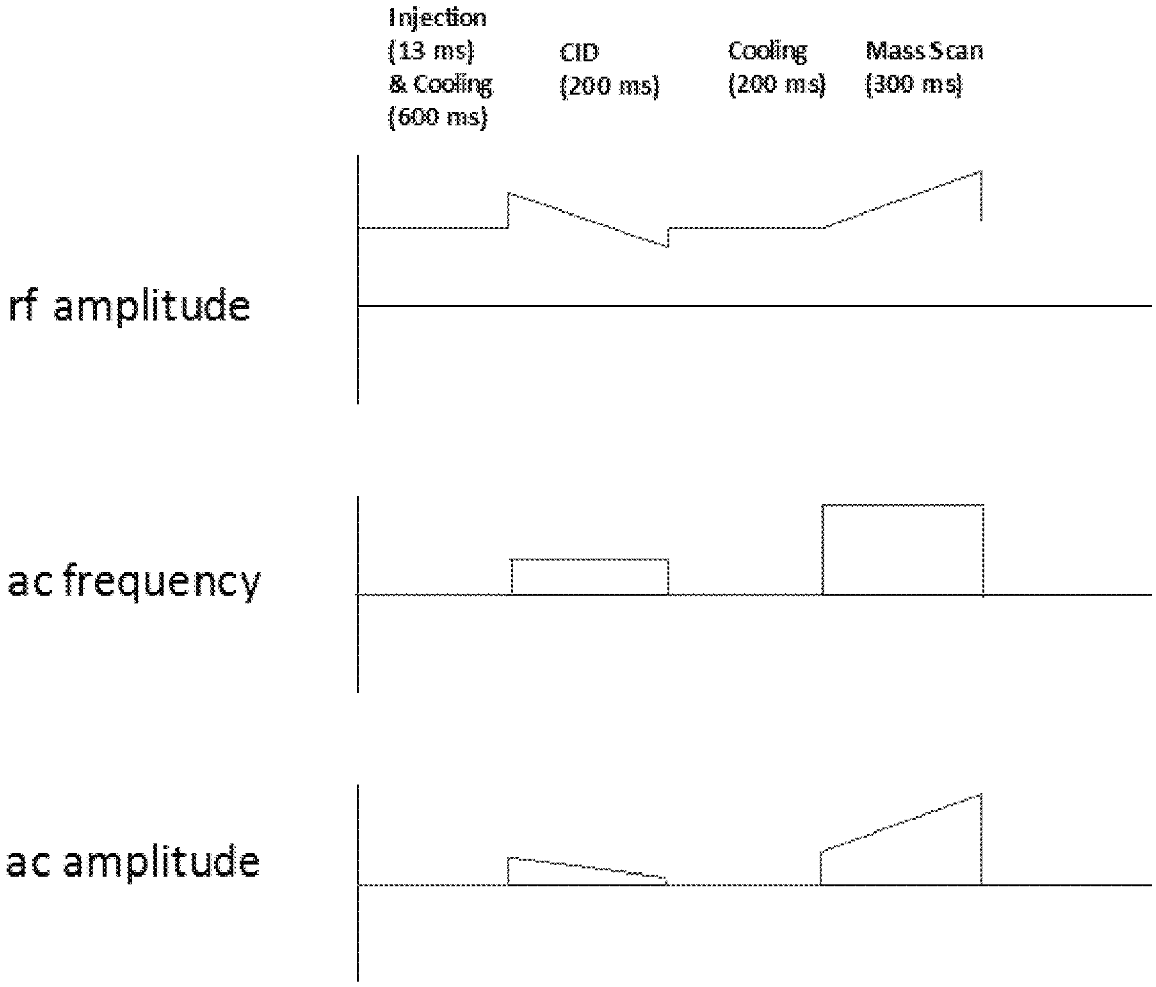

In the experiments performed here, the scan function in FIG. 1B was used. After the CID scan just described, ions were allowed to cool for ~270 ms, after which they were ramped out in the typical resonance ejection fashion by increasing the amplitude of both the AC and RF while keeping both frequencies the same (999 kHz and 349 kHz, respectively).

Figure 2A:
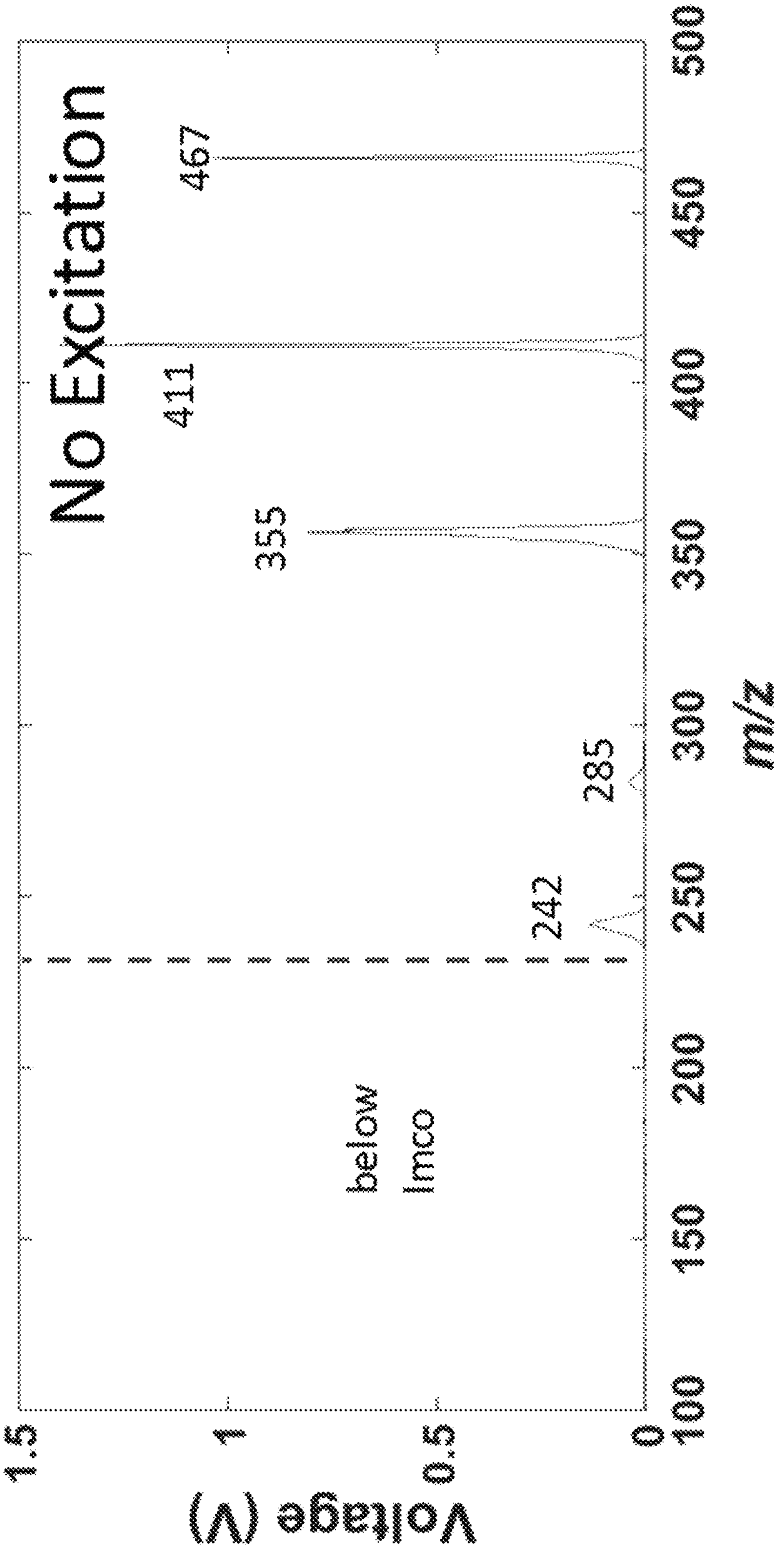
FIGS. 2A-C show comparison of constant q dissociation to SWIFT excitation.
Figure 2B:
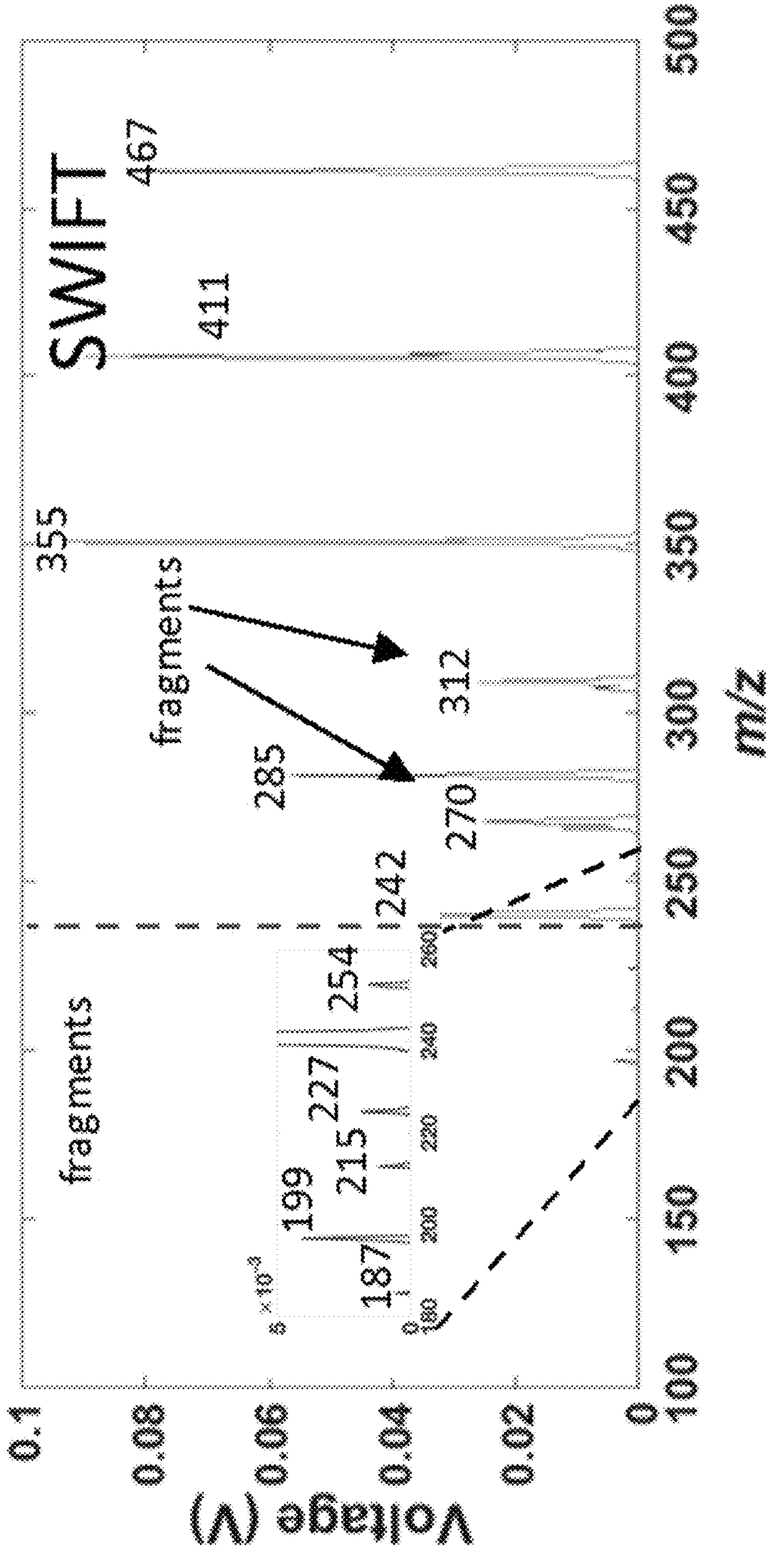

The full scan resonance ejection mass spectrum of five quaternary amines (tetraheptylammonium, m/z 411; tetrabutylammonium, m/z 242; hexadecyltrimethylammonium, m/z 285; tetrahexylammonium, m/z 355; and tetraoctylammonium, m/z 467, all molecular cations) obtained on the Mini 12 mass spectrometer is shown in FIG. 2A. The spectrum is a "blank excitation" since the scan function in FIG. 1B was used, but without application of the supplemental AC signal during the CID step. The high starting RF amplitude imposes a lower-mass cutoff that is indicated by the dotted lines. Any ions below this line are unambiguously product ions obtained from the CID step. FIG. 2B shows the result of applying a 200 ms SWIFT waveform for ion excitation followed by 200 ms cooling and an ion scan out step. Product ions m/z 270 and 312 were observed, but the lower-mass cutoff imposed by the RF amplitude prevents further fragments from being observed. Note that the RF amplitude was kept constant during SWIFT CID and was optimized for product ion intensity. The SWIFT amplitude and time of application were also optimized, but the varying q values of the ions prevents broad product ion coverage.

Example 2

Fragmented Ions at a Same Mathieu q Value Via a Reverse RF Ramp

Figure 2C:
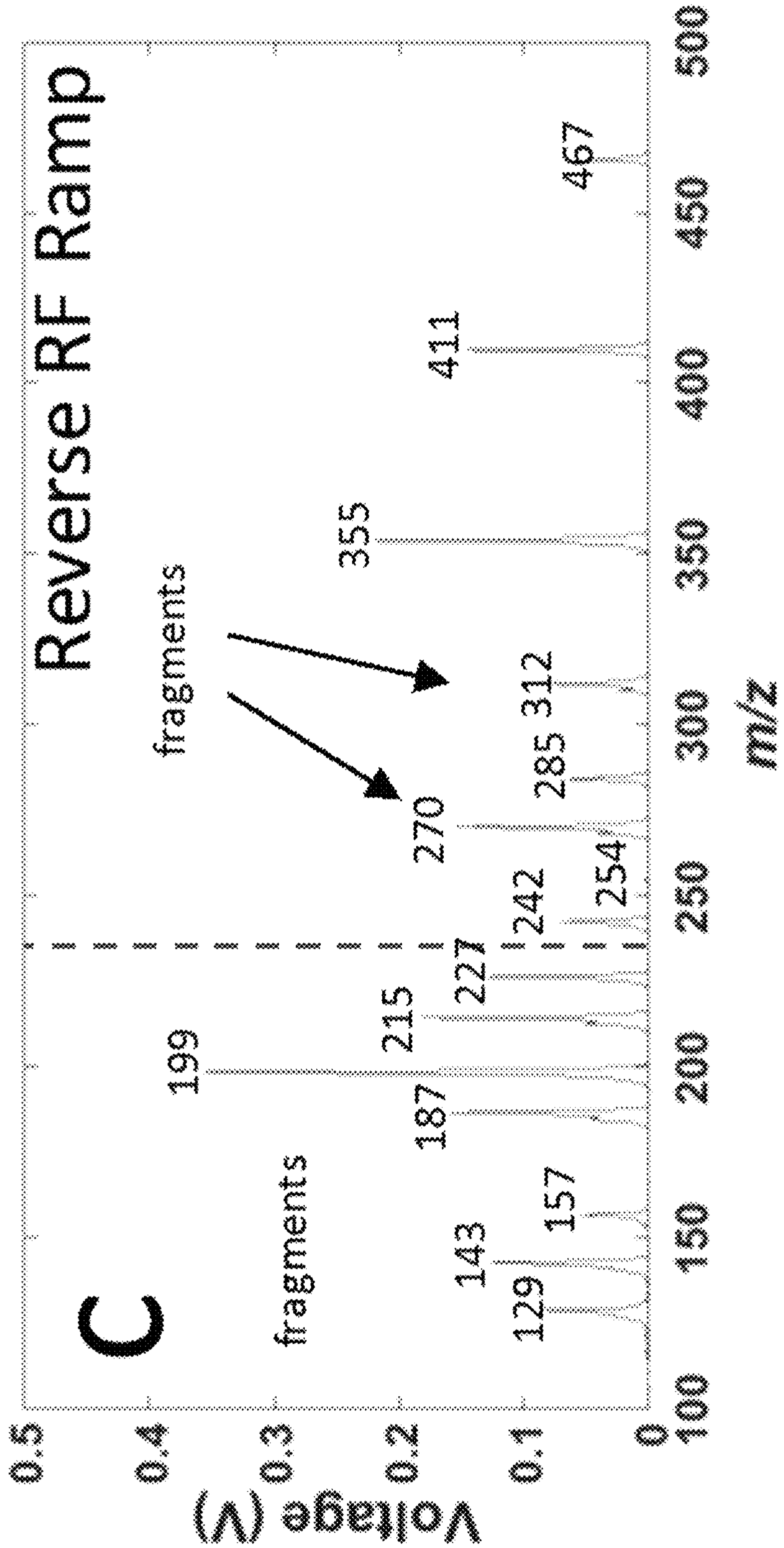

FIG. 2C provides a stark contrast to the SWIFT excitation data. To obtain this spectrum, a reverse RF ramp was combined with a fixed AC frequency and decreasing AC amplitude to effect dissociation at constant q. Fragment ion coverage is nearly ~100% (precursors and product ions obtained on an LTQ XL, Thermo Fisher, San Jose, CA, USA, are shown in Table 1), and product ion intensity is quite high, despite the short excitation period for each ion.

TABLE 1

Precursor ions and their respective product ions in FIGS. 1A-B*

| Precursor m/z | Product m/z |
|---|---|
| 242 | 142, 186 |
| 285 | 200, 268 |
| 355 | 128, 186, 198, 270 |
| 411 | 142, 214, 226, 312 |
| 467 | 156, 242, 254, 354 |

*Data obtained using an LTQ XL linear ion trap.

The advantage here is that all ions are fragmented at an optimal q value, which is chosen to balance product ion collection, precursor fragmentation, and mass range.

Example 3

Complex Mixture Analysis

Figure 3A:
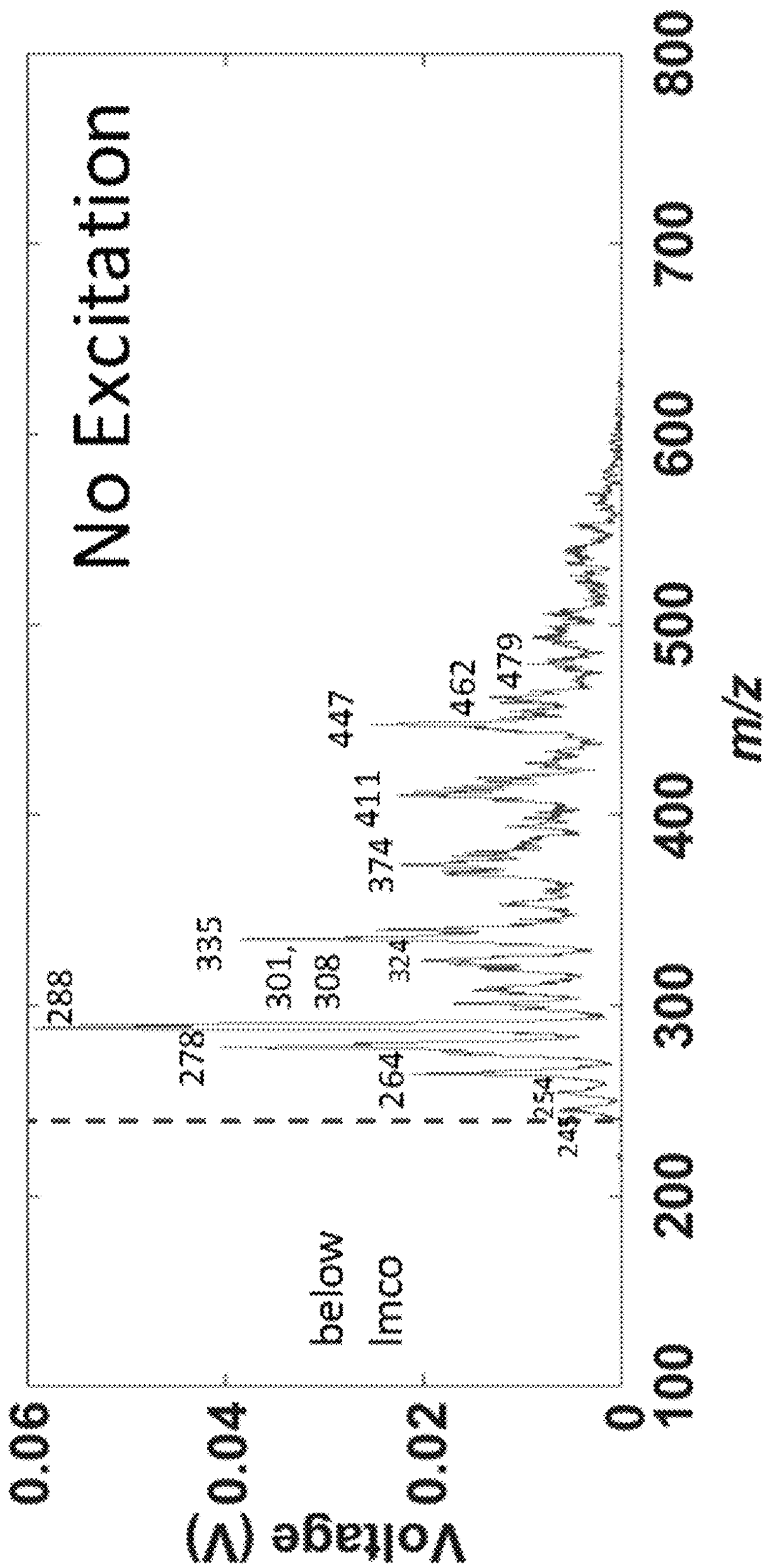
FIGS. 3A-C show comparison of constant q dissociation to SWIFT excitation.
Figure 3B:
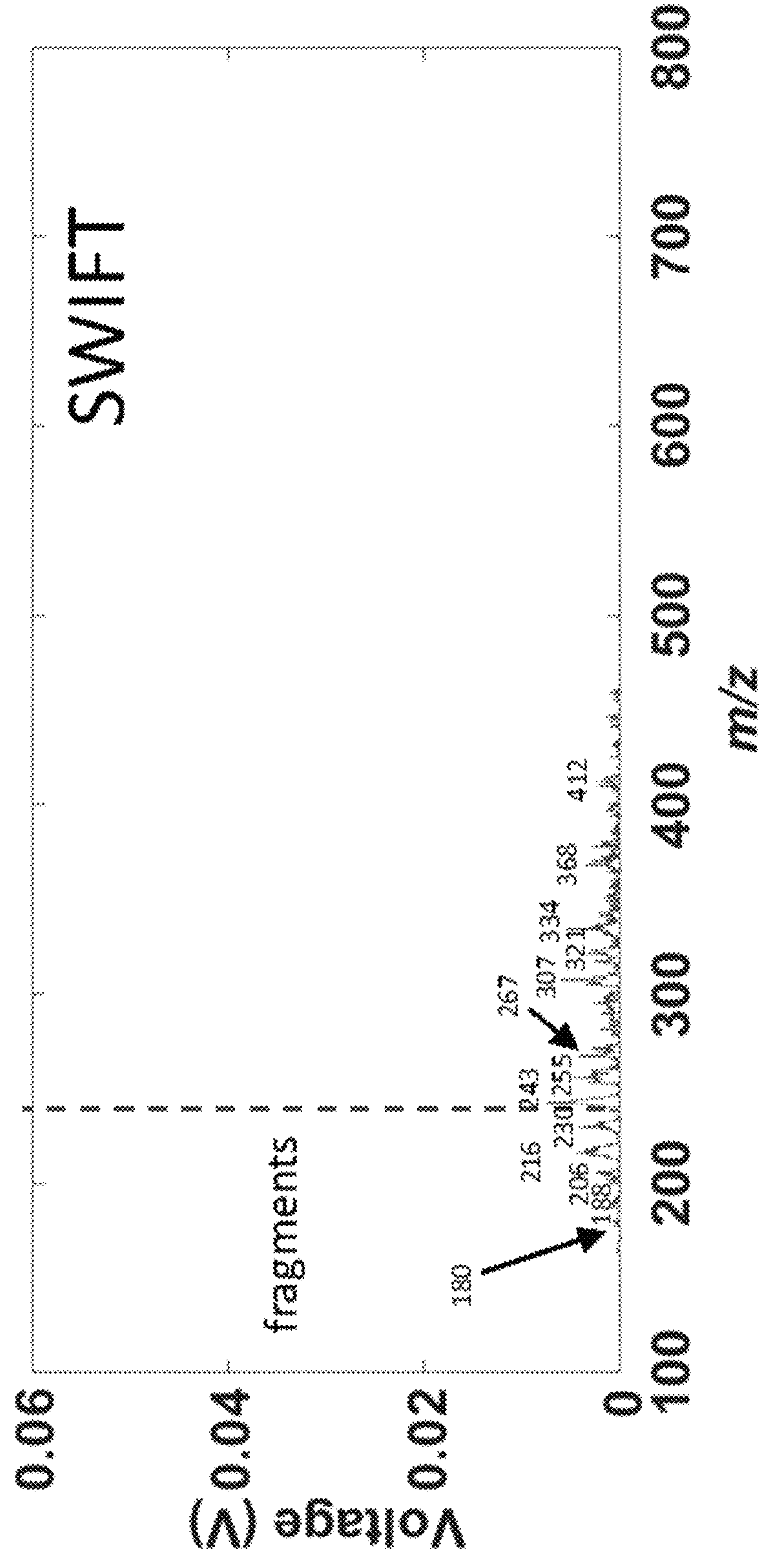

FIG. 3A shows the full scan "blank excitation" of a second mixture which is more complex. The intentionally introduced analytes were halogenated anilines, viz. chloroaniline, 2,4-dichloroaniline, and 4-bromoaniline. However, as shown, the actual ionized mixture is considerably more complex with many peaks being observed. The LMCO imposed during the blank CID step was chosen so that the signals due to the three introduced analytes were removed, thereby leaving only signals due to impurities and metabolites above ~m/z 220. In order to elucidate the structures of unknowns, generally CID is performed. Here we performed broadband CID to demonstrate the acquisition of a data over a significant portion of $MS^2$ space. The SWIFT excitation spectrum is shown in FIG. 3B and it suffers from the constraint of a constant LMCO, which is the direct result of increasing the RF amplitude during the CID step. The spectrum in FIG. 3C, however, does not exhibit this LMCO because the RF amplitude is ramped from high to low with a constant frequency and decreasing excitation amplitude. Once again, product ion coverage is excellent, although the limited resolution of the Mini 12 prevents many product ions from being resolved (see Table 2 for precursor and product ions obtained via CID on an LTQ XL).

TABLE 2

Figure 3C:
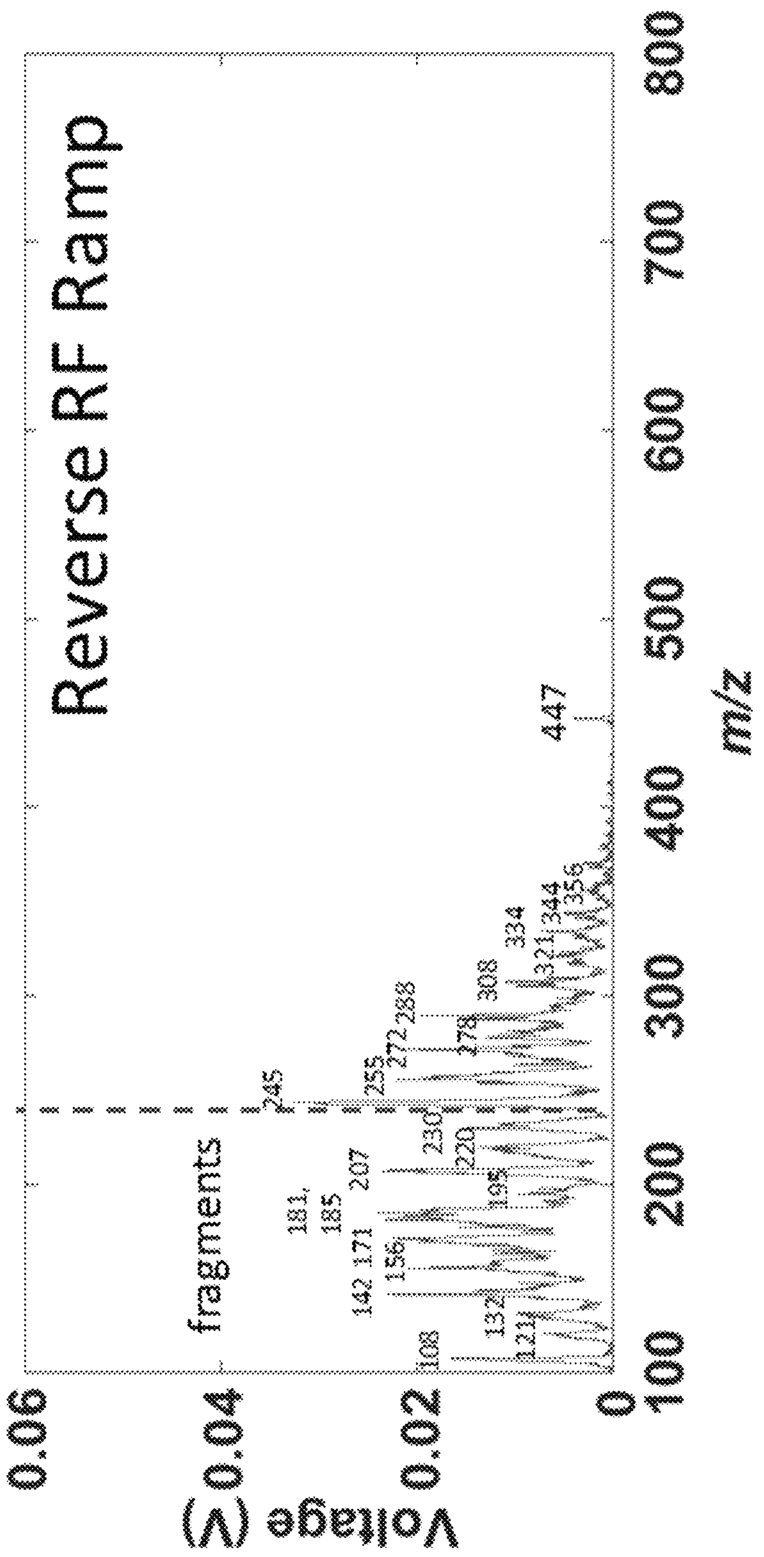

Precursor ions and their respective product ions in FIGS. 3A-C*

| Precursor m/z | Product m/z |
|---|---|
| 243 | 208, 106 |
| 253 | 222, 218, 194, 182, 150, 120, 106 |
| 263 | 248, 235, 228, 220, 213 |
| 277 | 242, 206, 140, 106 |
| 287 | 256, 207, 184, 120, 106 |
| 297 | 265, 247, 205, 128 |
| 300 | 273, 234, 197 |
| 307 | 292, 279, 275, 240, 228, 213, 196, 170 |
| 322 | 307, 294, 286, 243, 184, 140 |
| 334 | 307, 298, 231, 197 |
| 339 | 324, 311, 307, 304, 289, 246, 236, 213, 188 |
| 352 | 337, 324, 320, 249, 215 |
| 368 | 352, 341, 333, 287, 229, 212, 186 |
| 373 | 358, 345, 341, 338, 313, 280, 246, 222, 186 |
| 410 | 393, 382, 375, 333, 307, 299, 273 |
| 446 | 431, 418, 353, 343, 335, 319, 309, 307, 291 |
| 461 | 444, 434, 425, 368, 358, 334, 324, 322, |

*Data obtained using an LTQ XL linear ion trap.

Example 4

Observing Multiple Stages of CID

Figure 4A:
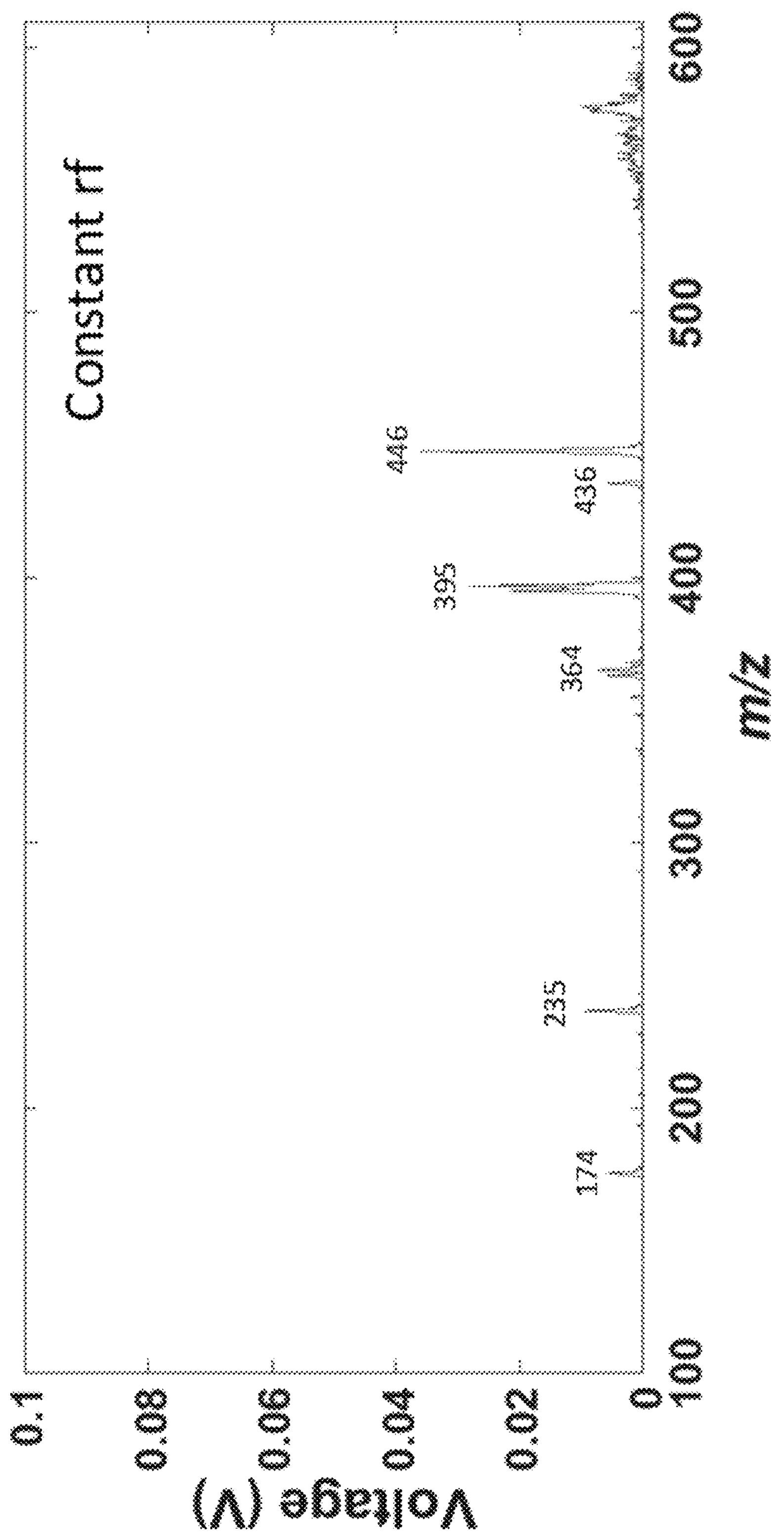
FIGS. 4A-B show observation of multiple stages of MS/MS.
Figure 4B:
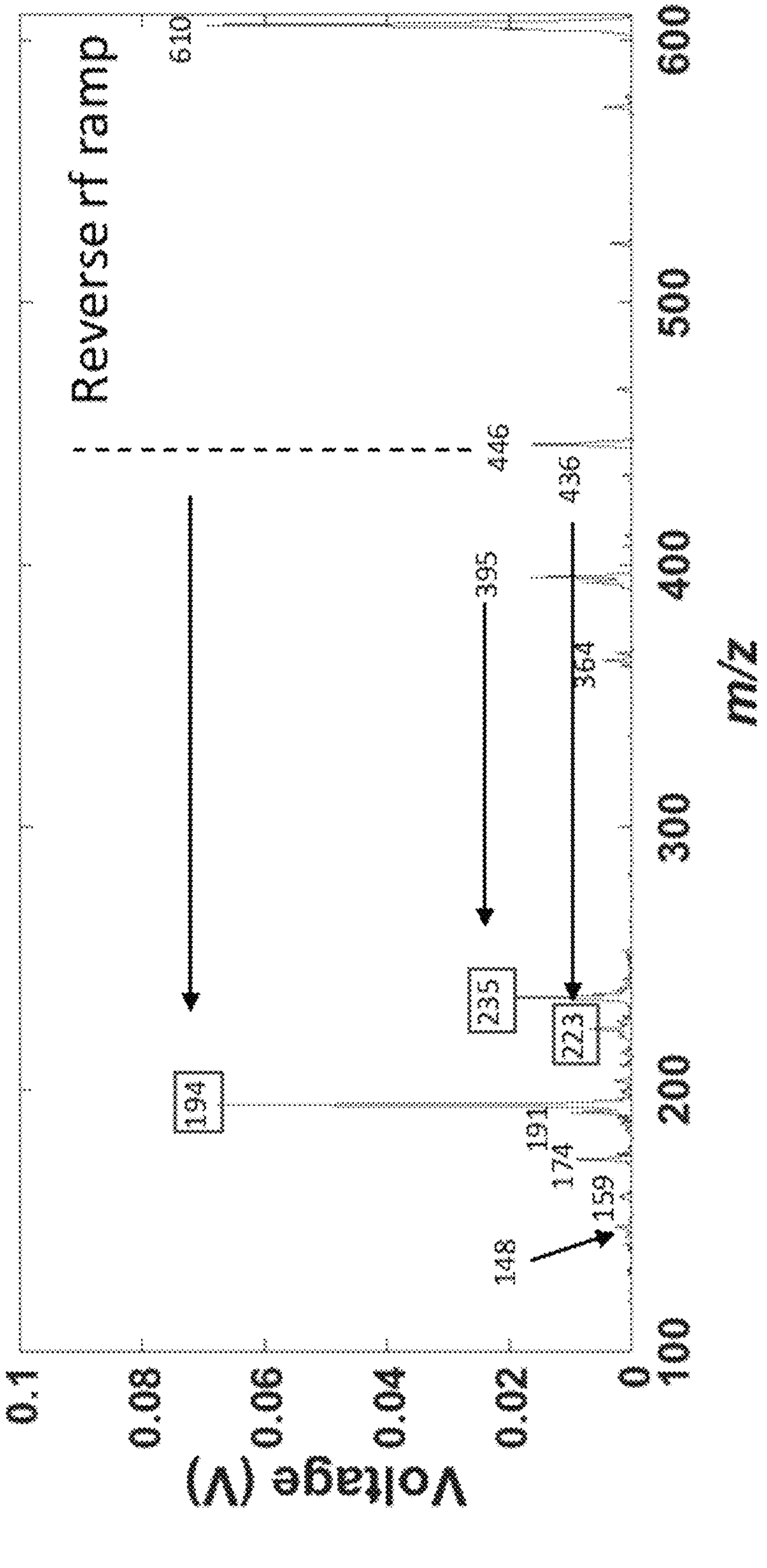

An interesting consequence of scanning the RF amplitude in the reverse direction and thus fragmenting from high to low mass is that multiple stages of CID can be observed. FIGS. 4A-B demonstrate this phenomenon for protonated reserpine (m/z 610, $[M+H]^+$). A typical constant RF $MS^2$ mass spectrum is given in FIG. 4A. The ions observed, m/z 174, 235, 364, 395, 436, and 446, and their relative intensities, are nearly identical to those obtained using other linear ion traps (e.g. an LTQ XL, not shown). However, the reverse RF ramp CID mass spectrum (FIG. 4B) is markedly different. In general high mass product ions have lower intensities and lower mass ions have higher intensities. Additionally, different ions are observed. This is the result of multiple stages of CID For example, product ion m/z 446 was observed to fragment to m/z 194 on an LTQ XL (an $MS^3$ experiment). The intensity of this peak is remarkably high, indicating efficient fragmentation of both the precursor and the first generation product ion. Furthermore, m/z 223 was determined to be the result of fragmentation of m/z 436, which is observed in hardly present in FIG. 4B, and m/z 235 is the product of fragmentation of m/z 395. These extra signals are a useful source of additional information that serve to characterize the precursor ion.

What is claimed is:

1. A mass spectrometry system comprising:
a mass spectrometer comprising an ion trap; and
a central processing unit (CPU), and storage coupled to the CPU for storing instructions that when executed by the CPU cause the system to:
generate a radio frequency (RF) signal comprising an amplitude; and
apply the RF signal to ions in the ion trap in a manner that after an injection and cooling period, the RF signal is increased and then a fixed frequency resonance excitation waveform is applied in presence of the RF signal for fragmenting the ions and the amplitude of the RF signal is then ramped in a reverse direction from high amplitude to low amplitude.

2. The system according to claim 1, wherein the CPU further causes the system to: apply a second signal that is a fixed frequency resonance excitation waveform with the RF signal that is applied in the reverse direction.

3. The system according to claim 2, wherein the fixed frequency resonance excitation waveform is a supplementary alternating current (AC) signal.

4. The system according to claim 3, wherein an amplitude of the supplementary alternating current (AC) signal is varied as a function of time.

5. The system according to claim 4, wherein the amplitude of the supplementary alternating current (AC) signal is ramped from a high amplitude to a low amplitude.

6. The system according to claim 2, wherein the CPU further causes the system to adjust the RF signal and the supplementary AC signal applied to the ion trap in a manner that causes fragmented ions to be ejected from the ion trap.

* * * * *